Sept. 30, 1969 — F. J. G. CLOUP — 3,469,306
COMBINED PUNCHING AND REAMING TOOL
Filed Dec. 26, 1967
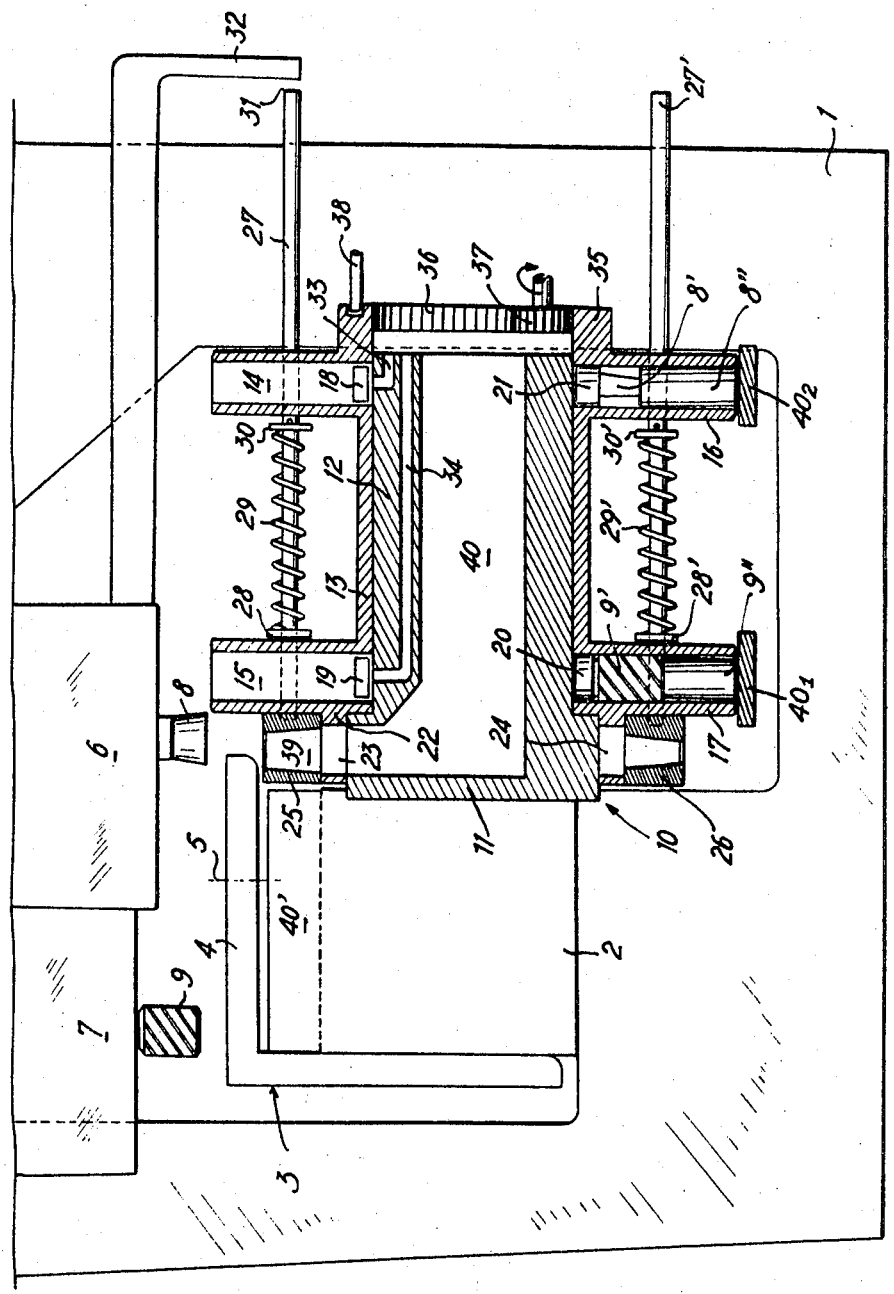

United States Patent Office 3,469,306
Patented Sept. 30, 1969

3,469,306
COMBINED PUNCHING AND REAMING TOOL
Francis Jean Gabriel Cloup, Paris, France, assignor to Promat S. a R.L., Latresne-Bordeaux, France, a company of France
Filed Dec. 26, 1967, Ser. No. 693,288
Claims priority, application France, Jan. 6, 1967, 90,198
Int. Cl. B23p 23/02
U.S. Cl. 29—564        10 Claims

ABSTRACT OF THE DISCLOSURE

A machine tool of which the purpose is the making of accurately sized round holes in metal plate-like elements such as angle iron; it consists of a combined and successively operating punch which initially makes the hole and a rotary bit which bores or reams it to the required accurate dimension; the head which supports these tools moves between two locations over the workpiece and may also move to a position whereat the tools are changeable for others which are held in store for use.

---

In certain branches of the field of construction, more especially those in which there are assembled metal structures using profiled metal sections of basically flat material joined by bolts or rivets, exactness of registration of the holes of different elements prohibits making the holes entirely by punching, and makes it necessary to drill, bore or ream them.

Drilling being an operation by cutting, is relatively slow. It has been proposed to make the holes in the profiled parts involved in this kind of construction, in two separate operations; in the first such operation there is made in the profiled part or other metal element a punched hole of less diameter than that ultimately required, and in a second operation the hole is enlarged to its correct diameter by use of a bit which bores or drills it out.

The operative procedure is long and costly because it involves transporting the workpiece from one machine to another.

The invention provides a remedy for this disadvantage. The invention resides in an improved machine tool for making holes in metal parts such as iron or steel sections of basically flat material such as angle iron or other analogous profiles, by successively punching and reaming, and it is essentially characterised by the fact that the two corresponding tools (punch and ream) are mounted so as to be capable of moving as a pair, between at least two positions bringing each tool in succession to register with the location of the work.

According to an example, the head carrying the paired tools is provided in a manner so as to be able to slide in a direction normal to and intersecting the axes of the two tools, so as to enable the punch and the drill boring tool successively to register with the required location of the hole to be pierced.

In order to make holes of different diameter with the same machine, it is provided with a store of further paired tools, and it is advantageous that the disengagement of tools carried by the head and the mounting of another pair occurs automatically without manual intervention.

To this end the machine carries a rotary turret-like store provided with pairs of parallel radial cylinders spaced along the rotation axis, one cylinder of each pair containing a punch and the other the corresponding reamer bit.

The turret is controlled in rotation about its axis by appropriate means such as toothed gearing from an electric motor, and it can be locked in the rotative positions in which a pair of the tool-carrying cylinders have their axes aligned with the axes of the respective tool holders of the head.

These tool holders are constituted by automatically controlled chucks or jaws and in order that they may grip the stored tools, the tool-carrying head may move into a third or tool-change position in which the two jaws register with two cylinders of a similar pair. In order to enable the jaws to grip the tools correctly, the latter are ejected from their respective cylinders by pneumatic or hydraulic means.

To this effect the cylinders in the working position are connected to a source of compressed air or hydraulic fluid, acting beneath a free piston in each cylinder on which piston rests the tool. The tools so ejected are seized by the jaws which are spaced apart by a distance equal to the separation of the corresponding pair of cylinders.

The turret is provided, as to each pair of cylinders, with a punching dolly or matrix for the corresponding punch and such is automatically controlled to register with the corresponding punch when the latter is in working position. Each matrix is carried by a slide controlled to this effect by a stop carried by the tool carrier in such a manner that the matrix associated with a pair of cylinders brought into working position, moves beneath the workpiece in register with the punch. Means are provided to return the matrix to its initial position when the tool-carrying head moves over the turret for a tool change.

By way of example there is described below and represented schematically in the accompanying drawings, an example of a machine according to the invention.

In the accompanying drawing 1 represents generally the frame of the machine and 2 the work table on which is fixed, by means not shown, the angle iron 3 of which the flange 4 is spaced from the upper face of the table 2, 5 being the axis of a hole required to be made in the flange.

The tool-supporting head is constituted by two blocks 6 and 7 rigid with each other, of which 6 comprises means to hold and control the marking movement of the punch 8 and 7 comprises means to hold and rotate the reamer bit 9, the holding means being a chuck or jaws of known kind controlled pneumatically or hydraulically. The blocks 6 and 7 constitute the head of the machine tool which is adapted to slide in the direction normal to the axes of the two tools 8 and 9.

To the work table 2 is fixed a hollow turret support 10 comprising a cylindrical part 11 having a greater diameter than its cylindrical part 12. On the cylindrical part 12 is mounted a rotatable turret 13 provided with pairs of radially arranged cylinders such as 14, 15 and 16, 17 intended to contain respectively associated punches and bits 8, 9 and 8', 9', free pistons 18, 19, 20 and 21 being disposed in the bottoms of the cylinders; the cylinders, e.g., 14, 15 of a pair are parallel, and are spaced in the direction of the axis of the turret.

Between the cylinders of a pair such as 15 and 16, the turret 13 is provided with an annular manifold 22 having openings 23, 24 complementary to each of the matrices 25, 26, associated with each pair of cylinders such as 14, 15 and 16, 17.

Each matrix, such as the one indicated at 25, is rigid with two rods which are parallel with the axis of the turret 13 and arranged between the two cylinders 14 and 15, one of the rods, indicated at 27, being visible in the drawing. The two rods 27 pass slidably through a perforated plate 28 fixed to the cylinder 15, there being a compression spring 29 between the plate 28 and a collar 30 which is fixed to the rod 27. The exposed ends 31 of the rods 27 can abut against a stop 32 carried by the head 6, 7. The registered matrix (25 in the drawing) slides in a groove 40' provided in the table 2.

The upper part of the turret support 12 has ducts 33 and 34 opening respectively to the bottoms of the registering cylinders 14 and 15, under the pistons 18 and 19, and the ducts are supplied by means not shown from a pressure-fluid source. The internal face of the end 35 of the turret 13 has an internal tooth ring 36 with which coacts a pinion 37 which is driven by an electric motor (not shown), a bolt 38 under pressure-fluid control, locking the turret 13 in one of its angular positions.

Means not shown are provided to lock the head 6, 7 in each of its controlled positions, which will become clear from the following description of the manner of operation of the machine.

To pierce a hole on the axis 5 in the flange 4 of the angle iron 3 with a diameter equal to that of the reamer bit 9, the head 6, 7 is at first positioned to the left in the drawing, when the axis of the punch 8 registers with the axis 5; in this situation, the stop 32 abuts the end of the rods 27 of the matrix 25, which is thereby registered exactly coaxially with the punch 8; further leftward, the punch 8 and matrix 25 move together, and the spring 29 is compressed until the punch 8, matrix 25 and axis 5 all register.

In this situation the punch 8 is operated by fluid pressure and forms the preliminary hole in the flange 4; the punching falls through the aperture 39 of the matrix 25. The punching operation being completed, the head 6, 7 is moved to the right (of the drawing) until the axis of the reamer bit registers with the axis 5, that is to say, the movement of the head is equal to the pitch distance between the tool axes.

By the effect of the spring 29, the rods 27 are moved to the right and the matrix 39 is returned to its illustrated position, the punching or cutout disc dropping into the chamber 40 of the turret carrier 12. Then, the head 6, 7 having been locked in its boring position, the control means causes the reamer bit 9 to rotate and to move downwards, so as to ream or enlarge the punched hole to the required diameter on the axis 5.

If it be required to make another hole of the same diameter the operation is repeated, the workpiece 3 having been repositioned. If, however, it is required to make a hole of different diameter, for example, corresponding to the reamer bit 9', the following is the operation.

The head 6, 7 is moved to the right until the tools 8, 9 register with the cylinders 14 and 15; the tools are then released by means not shown which open their holding jaws and the tools drop into the cylinders. The tools may be disengaged by ejectors (not shown) in the head. The bolt 38 is disengaged and the turret 13 is rotated until the cylinders 16 and 17 register with the tool holders. The bolt 38 is reengaged, and compressed air is introduced in the ducts 33 and 34, thus raising the pistons 20, 21 and lifting the new pair of tools (8', 9') into the respective holders where they are gripped by the jaws. The air supply then being cut off the pistons 20, 21 fall back to the bottoms of their cylinders by gravity.

The cylinders 14, 15, 16, 17 being open ended it is apparent that when they are directed downwards the tools in them would fall out; this is prevented by the provision of arcuate tracks $40_1$ and $40_2$ which closely surround the open ends of downwardly directed cylinders, so that the tools slide on the tracks and are retained in their respective cylinders.

To simplify the drawing only two pairs of cylinders are shown; it is intended that in practice there may be a greater number, for tools of a range of different diameters. Instead of arranging the tools in the rotating turret, the pairs of cylinders may be arranged in fan-like relationship, but in such cases the head 6, 7 will be provided so that it moves in the plane of the tool axes and also pivots on a vertical axis to be brought into a required radial position above the pair of cylinders.

The advantage of the machine tool according to the invention resides in the provision of a cycle of operation which is much better than that of existing machines for the same purpose, as well as the possibility of automatic operation following a control programme, and ensuring that boring is concentric with the punching.

I claim:
1. A machine tool comprising
    a bed to support a workpiece rigidly,
    a tool support having means for releasably holding a punch and reamer bit with their axes spaced and parallel,
    means for moving the said support in a direction normal to and intersecting the axes of the tools, and
    means for positively locating the said support in either of two positions relative to said bed such positions registering one or other tool in the work position relative to the bed.
2. A machine tool according to claim 1, with
    a rotatable turret having pairs of radial cylinders each pair to store a punch and a reamer bit,
    means for positively locating the said tool support in a third position in which tools supported thereby register with a pair of said cylinders, and
    means to rotate said turret to bring different pairs of cylinders into register with tools supported by said support.
3. A machine tool according to claim 2 in which each said cylinder contains a free piston,
    ducting is provided for pressure fluid to flow to and from each cylinder of one pair to act on their pistons to eject tools therefrom said ducting being opened for such flow when such pair of cylinders is in register with the said tool holder.
4. A machine tool according to claim 1, further comprising
    a matrix element adapted to be moved into and out of register with said punch and to be supported below the workpiece when said punch is registered for its work.
5. A machine tool according to claim 4, further provided with a supporting slideway in the bed to receive and support said matrix element, and
    means actuated by the movement of the tool support to effect the movements of said matrix.
6. A machine tool according to claim 2 in which there is provided a matrix element associated with each said pair of cylinders and carried by said turret.
7. A machine tool according to claim 2 in which fixed means for supporting the turret is made with a hollow cavity and the matrix last to receive a punching transfers the punching into the cavity.
8. A machine tool according to claim 1 comprising
    a frame,
    a bed adapted rigidly to support a workpiece and itself rigid with the frame and having a slideway in a surface thereof beneath the workpiece,
    a tool holder adapted releasably to hold a punching tool and a reamer bit on spaced parallel axes,
    means whereby said tool holder is mounted on said frame slidable in a direction normal to and intersecting the axes of said tool and bit,
    means for locking said tool holder in any three positions of sliding two of which are spaced equally to the distance between said axes,
    a rotatable turret having pairs of cylinders arranged radially and the cylinders of each pair being spaced lengthwise of the turret by a distance equal to said distance between axes,
    means to lock the turret in any one of a series of rotational positions to register with the punch and bit holding means of the tool holder when the latter is locked in the third above-predicted position, and
    means to transfer a punch and a bit from a pair of said cylinders to the tool holder.

9. A machine tool according to claim 8 in which said turret is supported rotatably on a fixed support provided with a pair of pressure-fluid ducts positioned so as to register and communicate with that pair of said cylinders which registers in said predicted position.

10. A machine tool according to claim 9 in which each cylinder contains a free piston to be acted upon by the pressure fluid and thereby to eject the corresponding tool from its cylinder.

References Cited

UNITED STATES PATENTS 2,164,616  7/1939  Manny _____ 29—564
2,838,968  6/1958  Amend _____ 29—564

FRANCIS S. HUSAR, Primary Examiner

U.S. Cl. X.R.

29—33